United States Patent
Arayashiki et al.

(10) Patent No.: US 6,332,001 B1
(45) Date of Patent: Dec. 18, 2001

(54) METHOD OF CODING IMAGE DATA

(75) Inventors: Akifumi Arayashiki; Ouichi Oyamada; Shin-Ichi Hirata, all of Sapporo (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/020,406

(22) Filed: Feb. 9, 1998

(30) Foreign Application Priority Data

Feb. 10, 1997 (JP) ................................................ 9-041696
Jan. 23, 1998 (JP) ............................................... 10-026692

(51) Int. Cl.[7] ................................................ H04N 7/12
(52) U.S. Cl. ................................. 375/240; 375/240.16
(58) Field of Search .................................... 348/416, 417, 348/418; 382/253; 375/240, 240.16

(56) References Cited

U.S. PATENT DOCUMENTS

| | | | |
|---|---|---|---|
| 5,200,820 | * 4/1993 | Gharavi | 348/416 |
| 5,561,475 | * 10/1996 | Jung | 348/416 |
| 5,649,030 | * 7/1997 | Normile et al. | 382/253 |
| 5,731,850 | * 3/1998 | Maturi et al. | 348/416 |

\* cited by examiner

*Primary Examiner*—Chris Kelley
*Assistant Examiner*—Allen Wong
(74) *Attorney, Agent, or Firm*—Wenderoth, Lind & Ponack, L.L.P.

(57) ABSTRACT

A method for coding an image including calculating, feature parameters which characterize an input block (range block) to be coded and a search block (domain block) in a reference image frame. These feature parameters can also be calculated and held in advance. The feature parameters are compared to seek a search block whose similarity to the input block is highest. A search process for seeking a similar block, i.e., a search process for seeking a motion vector or an affine transformation parameter, can easily and quickly be carried out simply by comparing the feature parameters without repeating square error calculations.

4 Claims, 9 Drawing Sheets

FIG. 1

PRIOR ART

PIXEL VALUES OF
RECTANGULAR BLOCK (4 × 4 PIXELS)     FIG. 7A

| 128 | 130 | 131 | 125 |
|---|---|---|---|
| 130 | 132 | 126 | 123 |
| 131 | 125 | 124 | 121 |
| 126 | 124 | 122 | 119 |

CONVERT PIXEL VALUES INTO BINARY VALUES WITH AVERAGE PIXEL VALUE 127

BIT IMAGE

| 1 | 1 | 1 | 0 |
|---|---|---|---|
| 1 | 1 | 0 | 0 |
| 1 | 0 | 0 | 0 |
| 0 | 0 | 0 | 0 |

FIG. 7B

NUMBER OF BITS "1" : 6

| 1 | 1 | 1 | 0 | 1 | 1 | 0 | 0 | 1 | 0 | 0 | 0 | 0 | 0 | 0 | 0 |
|---|---|---|---|---|---|---|---|---|---|---|---|---|---|---|---|

FIG. 7C

BIT STRING (16 BITS)

PARAMETER VARIABLE : EC80 (HEXADECIMAL) = 60544 (DECIMAL)

METHOD OF CODING IMAGE DATA

BACKGROUND OF THE INVENTION

1. Field of the Invention

The present invention relates to the art of motion-compensated interframe coding applicable to the coding of moving images, and more particularly to a method of detecting similarity of small regions (blocks) in an image between frames.

The present invention is also concerned with an iterative transform coding process which is applicable to the coding of still images or moving images, and more particularly to a method of detecting similarity of small regions (blocks) in an image within a frame or between frames.

2. Description of the Prior Art

Moving image data have heretofore been compressed by the MPEG (Moving Picture Experts Group) interframe coding process which codes a frame by referring to other frames which precede and follow the frame in time, or the H.261 and H.263 coding processes which code a frame by referring to another frame which precedes the frame in time.

These interframe coding processes incorporate motion-compensated interframe coding principles by which a frame is coded while compensating for a motion produced between frames.

At present, different MPEG versions such as MPEG-1 (ISO/IEC 11172) and MPEG-2(ISO/IEC 13818) are available in the art. Both MPEG-1 and MPEG-2 use three types of coded pictures including I-picture, P-picture, and B-picture. Specifically, a sequence of frames of a moving image is mixed with frames that have been coded with an either one of these types of coded pictures.

An I-picture is a picture frame that is intra-coded (intraframe-coded) independently of other frames. Macroblocks (a predetermined number of blocks of pixels) in the frame are all intra-coded. I-pictures which are periodically included in a sequence of frames of a moving image can be used as points for random access or error recovery.

A P-picture is a picture frame which is interframe predictive-coded from another frame that precedes the frame in time. The picture frame is predictive-coded only in a forward direction based on an I-picture or a P-picture positioned in the past.

A B-picture is a picture frame which is interframe predictive-coded from other two frames that precede and follow the picture frame in time. The picture frame is predictive-coded in a forward direction or a backward direction or both directions based on I-pictures or P-pictures that precede and follow the picture frame in time. The predictive direction is determined in terms of macroblocks.

ITU-T Recommendation H.261 and H.263 coding processes are the video coding standards for teleconferencing applications. The H.261 and H.263 coding processes do not compress a picture frame according to predictive-coding based on a frame that follows the picture frame in time, but compress a picture frame according to interframe predictive-coding based on a frame that precedes the picture frame in time. Specifically, the H.261 and H.263 coding processes use two types of coded pictures, i.e., I-picture and P-picture, and mix frames coded with either of these picture types with a sequence of frames of a moving image.

According to the above motion-compensated interframe coding principles, it is necessary to detect a motion vector in a moving image. One of processes for detecting such a motion vector is a block matching process.

The block matching process divides an image frame into rectangular regions (rectangular blocks) each comprising a matrix of 8×8 pixels or 16×16 pixels, and detects a motion per block between frames.

More specifically, the block matching process determines a motion vector by evaluating similarity between a block (input block) in a frame which it to be coded and blocks that are shifted a predetermined distance within a given search range about a block within a preceding frame (reference image frame) which is in the same position as the input block, and identifying a block (similar block) which has the highest similarity to the input block. For example, if a horizontal search range is ±15 pixels for each frame, then when a P-picture frame to be coded is 4 frames apart from a reference image frame, a search range of ±60 pixels is searched.

Therefore, a motion vector can be determined when similarity (predicted error) is calculated between blocks in an image frame to be coded and a reference image frame. As well known in the art, an accumulative sum of absolute errors AE or square errors SE is used as an evaluating function to determine similarity. An accumulative sum of absolute errors AE and an accumulative sum of square errors SE are expressed by the following equations:

$$AE = \sum_{i}^{N} |x_i - X_i|$$

$$SE = \sum_{i}^{N} (x_i - X_i)^2$$

where $x_i$: a pixel value in an input block or a range block;

$X_i$: a pixel value in a search block or a domain block; and

N: the number of pixels in a block.

The coding of an image according to a conventional block matching process which uses square errors SE will be described below with reference to FIG. 1 of the accompanying drawings.

Figure 1:
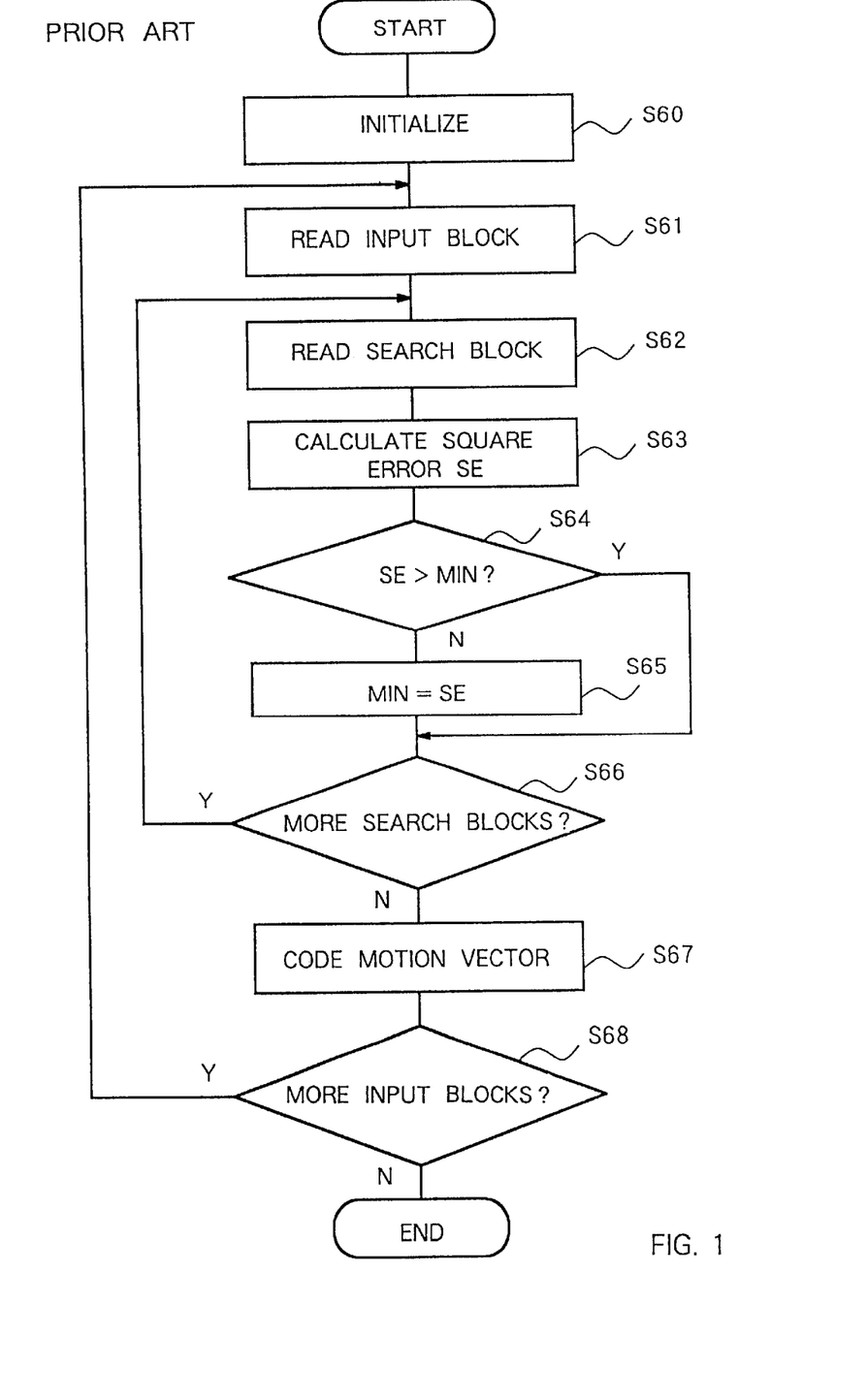
FIG. 1 is a flowchart of a processing sequence of a conventional block matching process.

As shown in FIG. 1, a variable MIN which holds a minimum square error SE (block similarity is higher as the square error SE is smaller) is initialized in a step S60, and thereafter a first input block is read from an image frame to be coded in a step S61. Then, a first search block is read from a search range in a reference image frame in a step S62.

A square error SE between the input block and the search block is calculated in a step S63, and the calculated square error SE is compared with the variable MIN in a step S64. If the square error SE is smaller than the variable MIN, then the calculated square error SE is held as the variable MIN, and the position of the search block in the frame is held in a step S65.

The steps S62–S65 are repeated until it is decided that all search blocks in the search range are processed in a step S66. A square error SE smaller than the variable MIN held in the preceding processing cycle is determined and held, and the position of the search block the frame is held in the step S65. In this manner, the position of the search block whose similarity is highest in the search range (with the minimum square error SE) is identified.

A motion vector between the input block and the identified block whose similarity is highest is coded in a step S67.

The steps S61–S67 are repeated until it is decided that all input blocks in the frame to be coded are processed in a step S68, thereby coding motion vectors between the input blocks and the search block.

As a result, a search block whose similarity to each of all the input blocks in the frame to be coded is high is identified as a similar block, and a motion vector between the input block and the similar block is coded.

Another known block matching process is an iterative coding process (fractal coding process) which divides a still image or a moving image into a plurality of blocks, searches a search range established in the image for a block (domain block) similar to a block (range block) to be coded, and codes an affine transformation parameter between the range block and the domain block.

The iterative coding process models an image using its self-correlation and codes an affine transformation parameter representative of a feature of the image, as disclosed in "Fractal Image Compression" written by A. E. Barnsley and L. P. Hurd, Numerical Science series—4, published by Toppan, "Image compression by iterative coding" written by Ida and Datake, Communication society, Spring National Conference, D-341, 1991, "A novel fractal block-coding technique for digital images" written by A. E. Jacquin, ICASSP 90 Proceeding, M8. 2, 1992, and U.S. Pat. No. 5,065,447.

The coding of an image according to a conventional iterative coding process which uses square errors SE will be described below with reference to FIG. 2 of the accompanying drawings.

Figure 2:
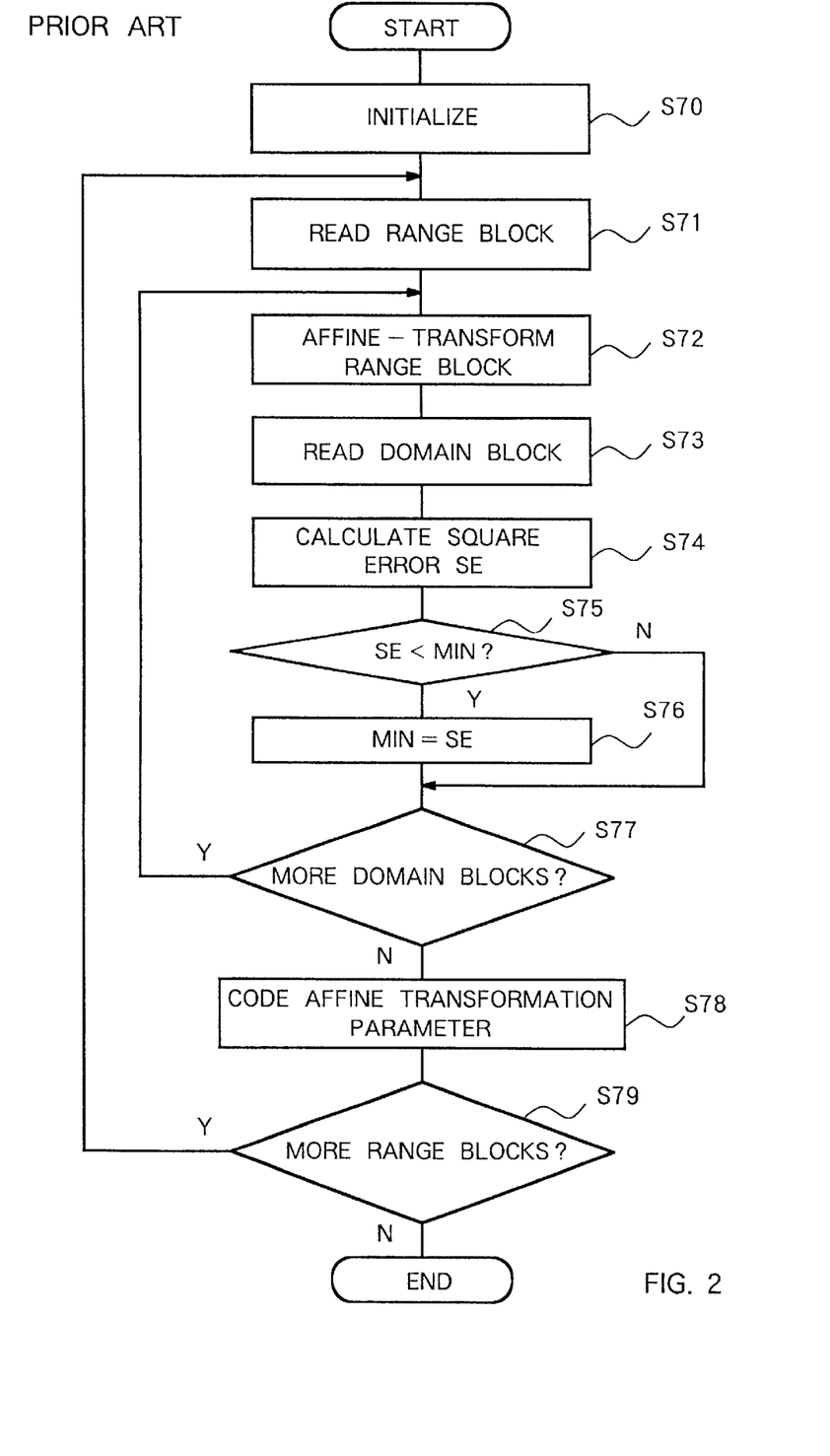
FIG. 2 is a flowchart of a processing sequence of another conventional block matching process.

As shown in FIG. 2, a variable MIN which holds a minimum square error SE is initialized in a step S70, and thereafter a first range block is read from an image to be coded in a step S71. Then, the range block is affine-transformed with respect to a first domain block in a predetermined search range in a step S72, after which the first domain block is read in a step S73.

A square error SE between the range block and the domain block is calculated in a step S74, and the calculated square error SE is compared with the variable MIN in a step S75. If the square error SE is smaller than the variable MIN, then the calculated square error SE is held as the variable MIN, and the parameter of the affine transformation is held in a step S76. The steps S72–S76 are repeated until it is decided that all domain blocks in the search range are processed in a step S77. A square error SE smaller than the variable MIN held in the preceding processing cycle is determined and held, and the parameter of the affine transformation is held in the step S76. In this manner, the domain block whose similarity is highest in the search range (with the minimum square error SE) is identified, and the affine transformation parameter is held.

An affine transformation parameter between the range block and the identified domain block whose similarity is highest is coded in a step S78.

The steps S71–S78 are repeated until it is decided that all range blocks in the image to be coded are processed in a step S79, thereby coding an affine transformation parameter between the range blocks and the domain block.

As a result, a domain block whose similarity to each of all the range blocks in the image to be coded is high is identified, and an affine transformation parameter between the range block and the domain block is coded.

According to the above conventional coding processes, however, each time the input block and the search block are changed, or each time the range block and the domain block are changed, it is necessary to calculate a square error SE and an absolute error AE. For calculating a square error SE and an absolute error AE, as many subtractions, multiplications, and additions as the number of pixels contained in blocks have to be repeatedly carried out.

Consequently, as the number of input blocks and search blocks or range blocks and domain blocks increases, the amount of calculations that need to be done also increases, resulting in a slower processing rate. Such a low processing rate presents a large obstacle to efforts to speed up the processing capability of an image data transmission system in particular.

SUMMARY OF THE INVENTION

It is therefore an object of the present invention to provide a method of quickly searching for a block with high similarity in a block matching process which is used for motion-compensated interframe coding or iterative transform coding.

Another object of the present invention is to provide such a searching method which lends itself to being carried out by a computer.

Still another object of the present invention is to provide a method of accurately searching for a block with high similarity.

To achieve the above objects, according to the present invention, feature parameters which characterize an input block in a frame to be coded and a search block in a reference image block are calculated, or such feature parameters are calculated and held in advance, the feature parameters are compared to seek a block whose similarity to the input block is highest. Therefore, feature parameters of the input and search blocks are calculated each time they are to be compared with each other, or feature parameters of one or both of the input and search blocks are calculated and held in advance.

Consequently, a search process for seeking a similar block, i.e., a search process for seeking a motion vector, can easily and quickly be carried out simply by comparing the feature parameters without repeating square error calculations.

The reference image frames may be frames that precede and follow the image frame to be coded in time according to the MPEG coding process, or may be a frame that precedes the image to be coded in time according to the H.261 or H.263 coding process.

The principles of the present invention are applicable to any of various motion-compensated interframe coding processes. If the present invention is applied to the H.261 or H.263 coding process, then a block similar to an input block in a P-picture frame is sought from an I-picture frame or a P-picture frame which precedes the P-picture frame in time.

The feature parameters may comprise binary values converted from pixel values of the blocks, the binary values being calculated and stored in advance in a read/write memory. Alternatively, each of the feature parameters may comprise bit string information with each bit representing one of the binary values, and the bit string information is compared to seek a block similar to the input block.

Consequently, feature parameters of blocks can quickly be obtained by simply and easily converting pixel values into binary values, and a block similar to the input block can quickly be sought by a simple process of comparing the binary information.

Further alternatively, the feature parameters may comprise the numbers of on-states or off-states of binary values converted from pixel values of the blocks, and the numbers are compared to seek a block similar to the input block.

Therefore, feature parameters of blocks can quickly be obtained by simply and easily converting pixel values into binary values, and a block similar to the input block can quickly be sought by a simple process of comparing the numbers of one-states or zero-states of binary values.

According to the present invention, a motion vector between the input block and the block similar thereto which has been sought is coded to code the image frame which contains the input block. Since, however, high block similarity may not be ensured by only comparing feature parameters, an evaluation based on an error between pixel values, e.g., a square error or an absolute error, may also be employed to ensure high block similarity. Stated otherwise, a motion vector may be coded after such an evaluation is applied to a similar block that has been sought by comparing feature parameters.

Specifically, an evaluation based on a square error is applied to a similar block that has been sought by comparing feature parameters from a search range, and a block whose error is smallest, i.e., whose similarity is greatest, in the search range is identified, after which a motion vector between the similar block and the input block is coded. Because of the evaluation based on the square error, the rate of the coding process is slightly lower than that of the coding process which only compares feature parameters. However, the coding process is much faster than the conventional coding process in which all the blocks in the search range are subject to the evaluation based on the square error, because the evaluation is applied to only those blocks which have been sought by comparing feature parameters.

Furthermore, according to the present invention for speeding up the coding process combined with the above evaluation, a threshold which serves as a reference for similarity is established in advance, and after an evaluation based on a square error is applied to a similar block that has been sought by comparing feature parameters from a search range, if the error is smaller than the threshold, a motion vector is coded without effecting an evaluation on other similar blocks. In this manner, the number of times that an evaluation based on a square error is carried out can be reduced while maintaining the similarity defined by the threshold. If the calculated error is greater than the threshold, then a block whose error is smaller than the threshold is continuously sought in the search range. If there is no block whose error is smaller than the threshold, then a motion vector with respect to a similar block whose error is minimum is coded.

The principles of the present invention are also applicable to a method of coding a still image or a moving image according to an iterative coding process. In this method, feature parameters which characterize a range block in an image to be coded and a domain block in a search range are calculated, or such feature parameters are calculated and held in advance, and a domain block whose similarity to the range block is sought by comparing the feature parameters. Therefore, feature parameters of the range and domain blocks are calculated each time they are to be compared with each other, or feature parameters of one or both of the range and domain blocks are calculated and held in advance.

Consequently, a search process for seeking a domain block, i.e., a search process for seeking an affine transformation parameter, can easily and quickly be carried out simply by comparing the feature parameters without repeating square error calculations. The present invention is applicable to any of various coding processes described above.

The feature parameters may comprise binary values converted from pixel values of the blocks, bit string information with each bit representing one of the binary values, or the numbers of one-states or zero-states of binary values converted from pixel values of the blocks.

Therefore, feature parameters of blocks can quickly be obtained by simple and easy calculations, and a similar domain block can quickly be sought by a simple process of comparing the feature parameters.

According to the present invention, an affine transformation parameter between a similar domain block which has been sought as described above and a range block is coded to code an image which contains the range block. Since, however, high block similarity may not be ensured by only comparing feature parameters, an evaluation based on an error between pixel values, e.g., a square error or an absolute error, may also be employed to ensure high block similarity, and an affine transformation parameter may be coded after such an evaluation is applied to the similar domain block which has been sought by comparing the feature parameters.

If no similar domain block in the search range can be found by comparing the feature parameters, then the range block is coded according to a known orthogonal transformation, such as a discrete cosine transform.

Specifically, an evaluation based on a square error is applied to a similar block that has been sought by effecting an affine transformation and comparing feature parameters from a search range, and a domain block whose error is smallest, i.e., whose similarity is greatest, in the search range is identified, after which an affine transformation parameter between the domain block and the range block is coded. Because of the evaluation based on the square error, the rate of the coding process is slightly lower than that of the coding process which only compares feature parameters. However, the coding process is much faster than the conventional coding process in which all the blocks in the search range are subject to the evaluation based on the square error, because the evaluation is applied to only those domain blocks which have been sought by comparing feature parameters.

According to the present invention, furthermore, for speeding up the coding process combined with the above evaluation, first and second thresholds which serve as references for similarity are established in advance, and after an evaluation based on a square error is applied to a domain block that has been sought by comparing feature parameters from a search range, if the error is smaller than the first threshold, an affine transformation parameter is coded without effecting an evaluation on other domain blocks. If the error is greater than the first threshold, then a domain block whose error is smaller than the second threshold is continuously sought in the search range, and an affine transformation parameter with respect to the domain block whose error is smaller than the second threshold is coded. The first threshold is set to a value smaller than the second threshold, i.e., for higher similarity.

In this fashion, the number of times that an evaluation based on a square error is carried out can further be reduced while maintaining the similarity defined by the thresholds. If there is no block whose error is smaller than the second threshold, then the range block is coded according to a known orthogonal transformation, such as a discrete cosine transform.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Methods according to embodiments of the present invention are carried out by a computer which has hardware resources including a processor, memories, etc., and executes a given program, and are implemented as a process of processing image data to be coded. More specifically, the methods can be carried out by an image processing system which codes moving image data according to a motion-compensated predictive interframe coding process and transmits or stores the coded moving image data, or an image processing system which codes moving and still image data according to an iterative coding process and transmits or stores the coded moving and still image data.

Figure 3:
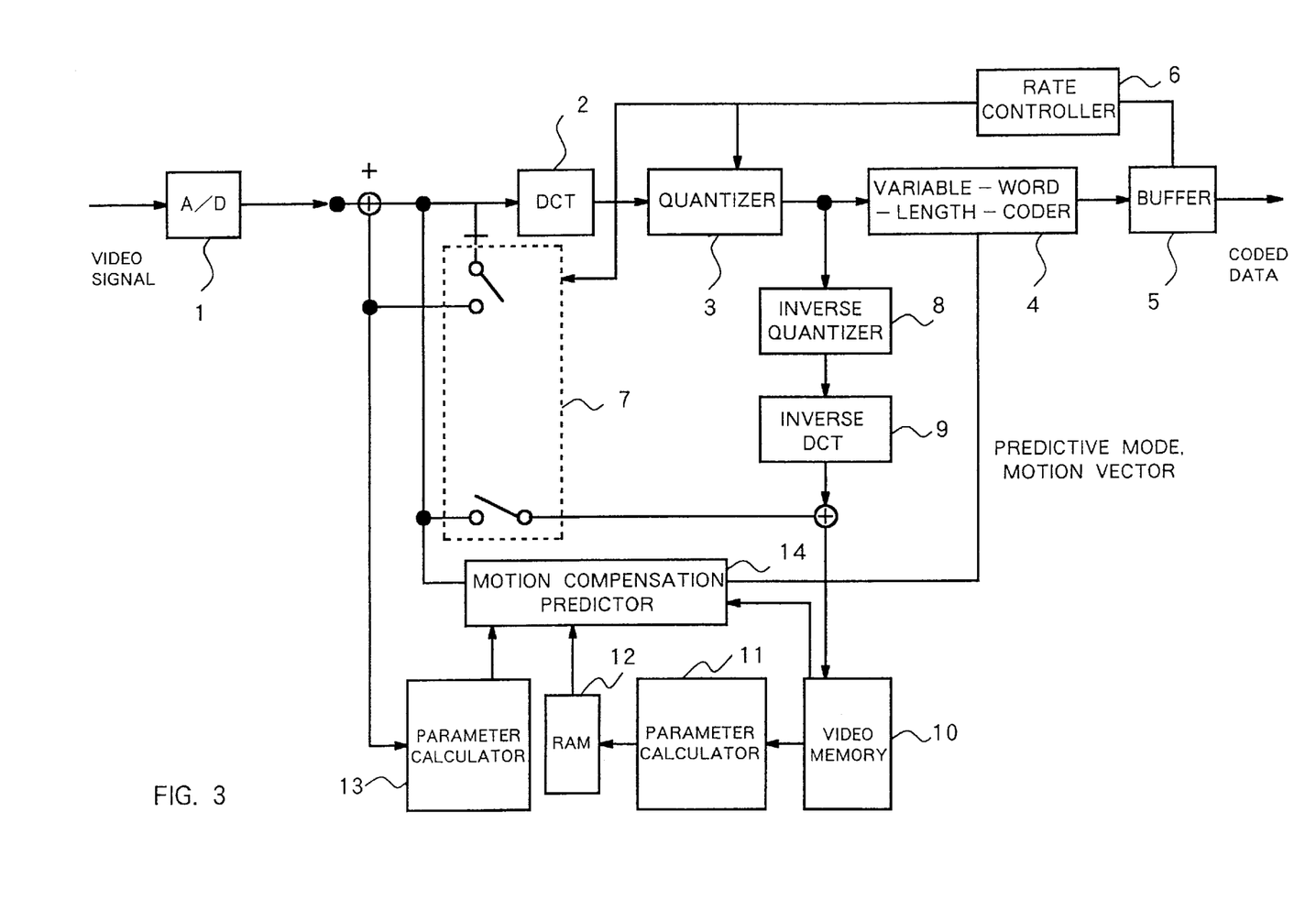
FIG. 3 is a block diagram of a coder according to the present invention.

FIG. 3 shows, by way of example, an H.261 or H.263 coder for coding moving image data according to a motion-compensated predictive interframe coding process.

The H.261 or H.263 coder shown in FIG. 3 operates as follows: An input video signal is converted by an A/D converter 1 into a digital signal, which is discrete-cosine-transformed by a DCT unit 2. The discrete-cosine-transformed digital signal is quantized by a quantizer 3, and then coded by a variable-word-length coder 4 into coded data, which is written into an output buffer 5. A first image frame of the video signal is intraframe-coded for each macroblock which comprises a matrix of 16×16 pixels.

The coded data stored in the output buffer 5 is transmitted over a transmission path. Depending on how the coded data is transmitted, a rate controller 6 controls the quantization characteristics in the quantizer 3 and also controls a switch 7 to switch between an intraframe coding process and an interframe coding process which are to be effected on image frames. When the switch 7 is shifted to select the intraframe coding process, it intraframe-codes the first image frame of the video signal. The interframe coding process incorporates a motion-compensated interframe coding process.

When the switch 7 is shifted to select the interframe coding process, it codes second and subsequent image frames of the video signal according to the motion-compensated interframe coding process in order to generate P-picture frames.

In the motion-compensated interframe coding process, an image frame which precedes an image frame to be coded, i.e., a past coded image frame, is decoded by an inverse quantizer 8 and an inverse DCT unit 9, and the difference between the decoded preceding image frame and the image frame to be coded, i.e., a second or subsequent image frame, is calculated to seek a motion vector for each macroblock. The motion vector is coded by the variable-word-length coder 4 into coded data, which are written as transmission data into the output buffer 5. The transmission data of such an image frame which has been motion-compensated interframe-coded comprises macroblocks whose motion vectors are variable-word-length-coded and macroblocks whose quantized DCT coefficients are variable-word-length-coded.

As described in detail later on with reference to FIGS. 3 and 4, a search process for searching for a motion vector for each macroblock is carried out by a video memory 10 which holds a decoded preceding image frame, a parameter calculator 11 which calculates a feature parameter that characterizes a macroblock (search macroblock) in the decoded preceding image frame, a RAM 12 which stores the calculated feature parameter, a parameter calculator 13 which calculates a feature parameter that characterizes a macroblock (input macroblock) in the image frame to be coded, and a motion compensation predictor 14 which compares the feature parameters of the input and search blocks and calculates a square error thereby to seek a motion vector.

If the correlation between image frames is relatively large, then it is possible to seek a block similar to an input block from a search range. If, however, the correlation between image frames is small such as in a moving picture with large movement between image frames, then it is impossible to seek a block similar to an input block, and hence the switch 7 is shifted to code the input block with the DCT unit 2, the quantizer 3, and the variable-word-length coder 4.

Figure 4:
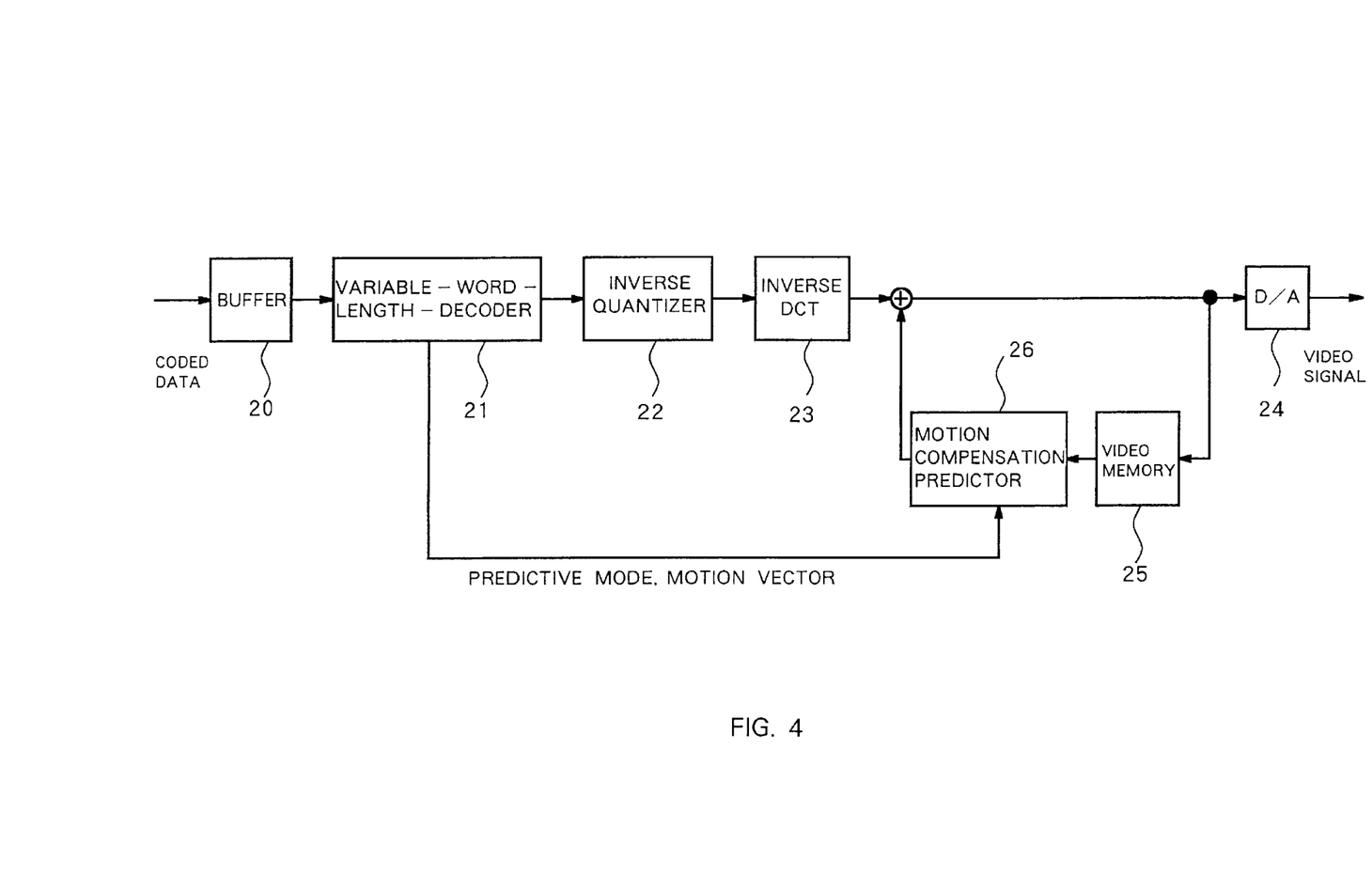
FIG. 4 is a block diagram of a decoder according to the present invention.

FIG. 4 shows a decoder for decoding a video signal which has been coded by the coder shown in FIG. 3.

The decoder shown in FIG. 4 operates as follows. Input coded data is first stored in a buffer 20, and is then decoded by a variable-word-length decoder 21, an inverse quantizer 22, and an inverse DCT unit 23 into a decoded signal. The decoded signal is converted by a D/A converter 24 into an analog video signal, which is outputted as a video signal. The decoded signal is also stored in a video memory 25. For decoding an interframe-coded image frame, the variable-word-length decoder 21 controls a motion compensation predictor 26 to decode the interframe-coded image frame in an interframe mode based on a preceding image frame which is stored in the video memory 25.

Figure 5:
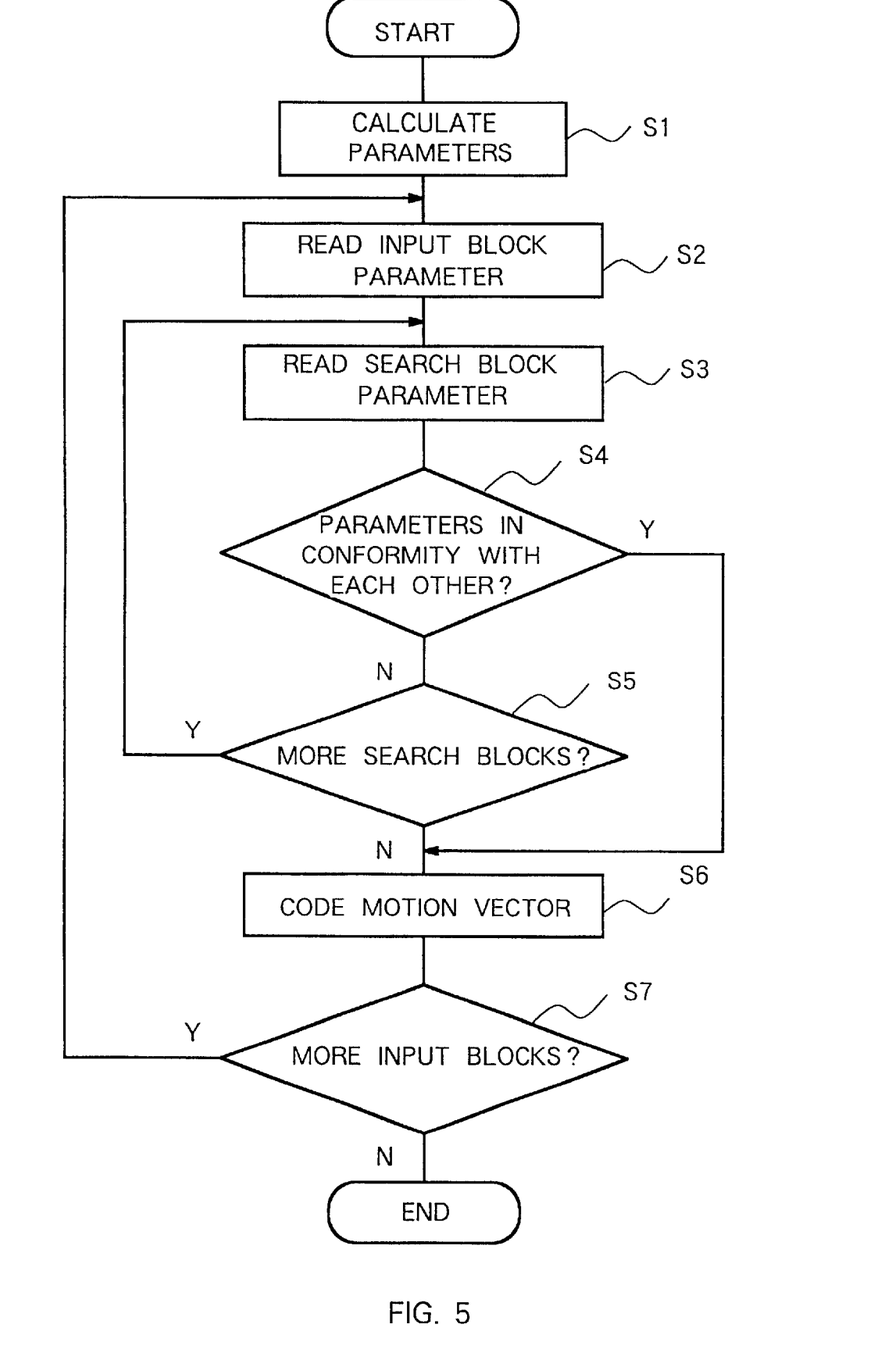
FIG. 5 is a flowchart of a processing sequence of a method of coding image data according to an embodiment of the present invention.

FIG. 5 shows a processing sequence of a method of coding image data using a block matching process according to an embodiment of the present invention.

As shown in FIG. 5, feature parameters which characterize an input block in an image frame to be coded and a block (search block) in a search range in a reference image frame are calculated, and stored in a read/write memory in a step S1. The feature parameters may be any of various quantities such as a value of a pixel at a central position in the block. In this embodiment, the feature parameters comprises binary information representing the average of pixel values of each block, as described later on with reference to FIGS. 7A through 7D.

In order to identify the position of the input block in the image frame to be coded and the position of a similar block in the reference image frame, identifiers of these blocks (or positional information thereof) are stored, along with the feature parameters, in the read/write memory.

After the above preparatory process, a search process is carried out. The feature parameter of the first input block is read from the memory in a step S2, and then the feature parameter of the first search block in the search range is read from the memory in a step S3.

Thereafter, the feature parameters of the input and search blocks are compared with each other in a step S4. If the feature parameters are in conformity with each other, the search block is regarded as a block similar to the input block, and a motion vector between the search block and the input block is coded in a step S6.

The search process is repeated with respect to all search blocks in the search range until a search block whose feature parameter is in conformity with that of the input block is found in a step S5. The steps S2–S6 are repeated with respect to a next input block until all input blocks are processed in a step S7.

As a result, a similar search block is identified with respect to each input block, and a motion vector is calculated on the basis of positional information of the input block and the similar block according to a known process, after which the motion vector is coded.

The feature parameters of the input and search blocks may not necessarily be in complete conformity with each other, but may be regarded as being in conformity with each other if any difference therebetween falls within a certain allowable range.

If a similar block whose feature parameter is in conformity with that of the input block is detected in the step S4, then no other search blocks may be processed, i.e., control may skip the step S5, and a next input block may be processed in the step S7 after the motion vector is coded in the step S6. This modification is effective to speed up the search process though it may possibly result in a lower degree of accuracy.

Figure 6:
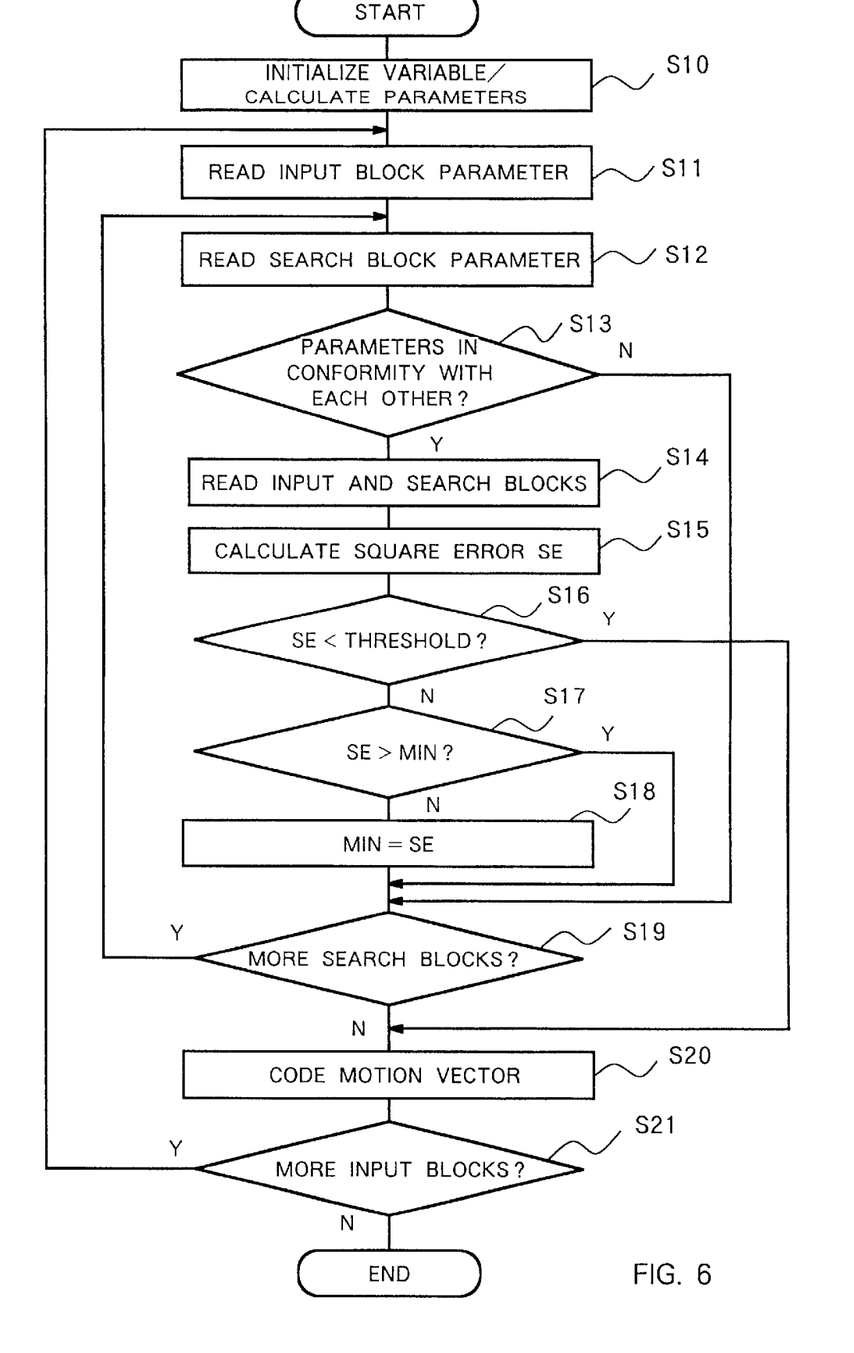
FIG. 6 is a flowchart of a processing sequence of a method of coding image data according to another embodiment of the present invention.

FIG. 6 shows a processing sequence of a method of coding image data using a block matching process according to another embodiment of the present invention. The method shown in FIG. 6 is designed to increase the accuracy of a search process with evaluations based on square errors, which are added to only those search blocks whose feature parameters are inconformity with those of input blocks.

As shown in FIG. 6, a variable MIN which holds a minimum square error SE is initialized, and feature parameters which characterize input and search blocks are calculated, and stored, along with information indicative of the positions of the blocks, in a read/write memory in a step S10.

The feature parameter of the first input block is read from the memory in a step S11, and then the feature parameter of the first search block in the search range is read from the memory in a step S12.

Thereafter, the feature parameters of the input and search blocks are compared with each other in a step S13. If the feature parameters are in conformity with each other, the search block and the input block are read in a step S14, and a square error SE therebetween is calculated in a step S15.

The calculated square error SE is compared with a threshold, which is preset to obtain similarity beyond a certain level, in a step S16. If the square error SE is smaller than the threshold, then since the search block is similar to the input block beyond the given level of similarity, a motion vector between the search block and the input block is coded in a step S20.

If the square error SE is greater than the threshold, then the square error SE is compared with the variable MIN in a step S17. If the square error SE is smaller than the variable MIN, then the square error SE is held as the variable MIN, and the positional information of the search block in the image frame is stored in the memory in a step S18.

If a search block whose square error SE is smaller than the threshold is not found, the steps S12–S18 is repeated until all search blocks in the search range are processed in a step S19, and a square error SE smaller than the variable MIN held in the preceding processing cycle is held and the position of the search block in the image frame is stored in the step S18. A motion vector between the search and input blocks with the smallest square error therebetween is finally coded in the step S20.

Therefore, a search block whose feature parameter is in conformity with that of the input block is identified as a similar block after being evaluated by the square error, and a motion vector between the similar and input blocks is immediately coded if the square error therebetween meets a certain threshold condition. If the square error therebetween does not meet the threshold condition, then a motion vector between the input block and a search block with the smallest square error in the search range is coded.

The steps S11–S20 are repeated with respect to a next input block until all input blocks in the image frame to be coded are processed in a step S21. As a result, a search block whose similarity is high with respect to each input block is identified as a similar block, and a motion vector is calculated on the basis of positional information of the input block and the similar block according to a known process, after which the motion vector is coded.

A process of calculating the average of pixel values as a feature parameter which characterizes a block will be described below with reference to FIGS. 7A through 7D.

Figure 7A:
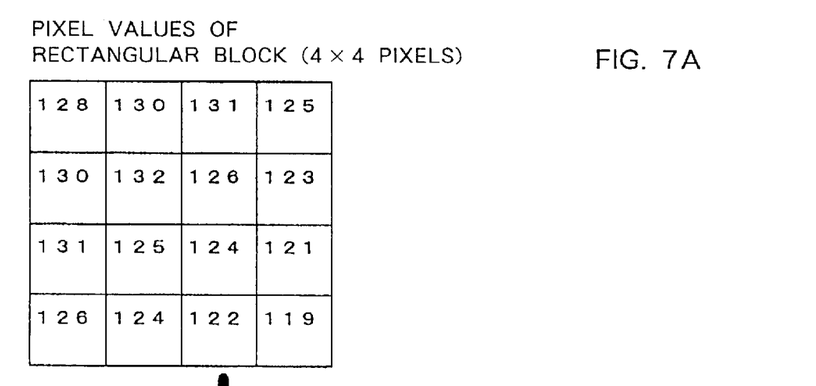
FIGS. 7A through 7D are diagrams illustrative of a process of calculating a feature parameter.
Figures 7B, 7C:
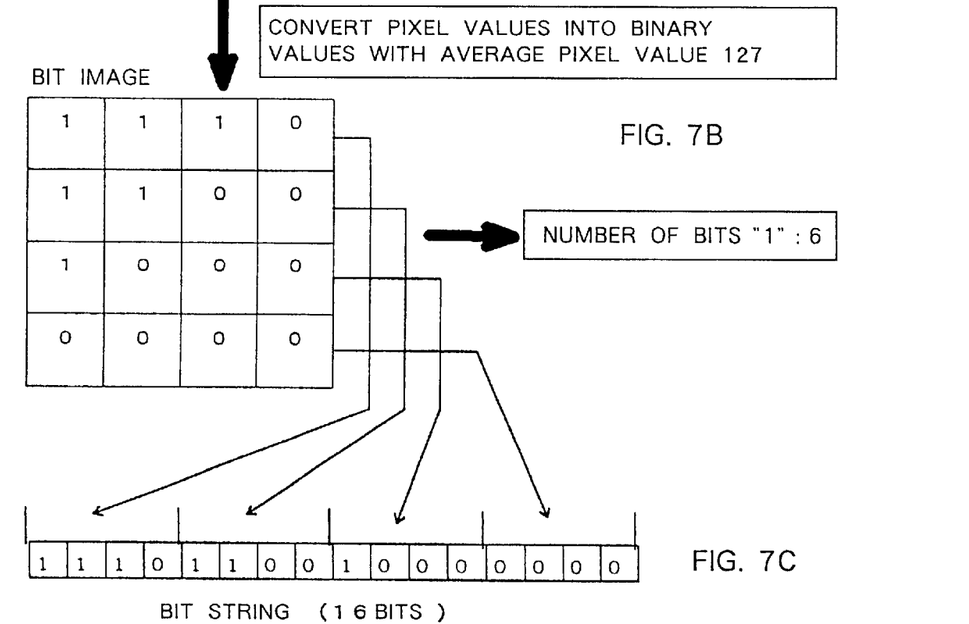
Figure 7D:
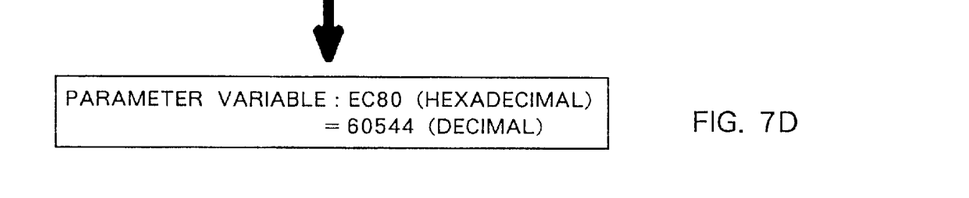

FIG. 7A shows a distribution of pixel values in a block which comprises a matrix of 4×4 pixels. These pixel values are converted into binary values using a reference level which represents the average (127) of the pixel values as shown in FIG. 7B. As shown in FIG. 7C, the binary values are then converted into 16-bit string information (linear information or one-dimensional information) with each bit representing one of the binary values. As shown in FIG. 7D, the 16-bit string information is then expressed by a hexadecimal representation or a decimal representation, which is used as a feature parameter. The pixel values may be converted into binary values using a reference level which represents a central one of the pixel values.

Feature parameters may be compared with each other using the bit image (two-dimensional information) shown in FIG. 7B. However, feature parameters in the form of the linear information shown in FIG. 7C or the hexadecimal or decimal representation shown in FIG. 7D can easily and quickly be compared with each other by a computer because the data format is normally handled by the computer.

If a block comprises a matrix of 8×8 pixels, then 64-bit string information can be produced therefrom by the process shown in FIGS. 7A through 7C. However, a feature parameter can be generated as 16-bit string information by converting every 4 pixels in the matrix of 8×8 pixels into a binary value.

Figure 8:
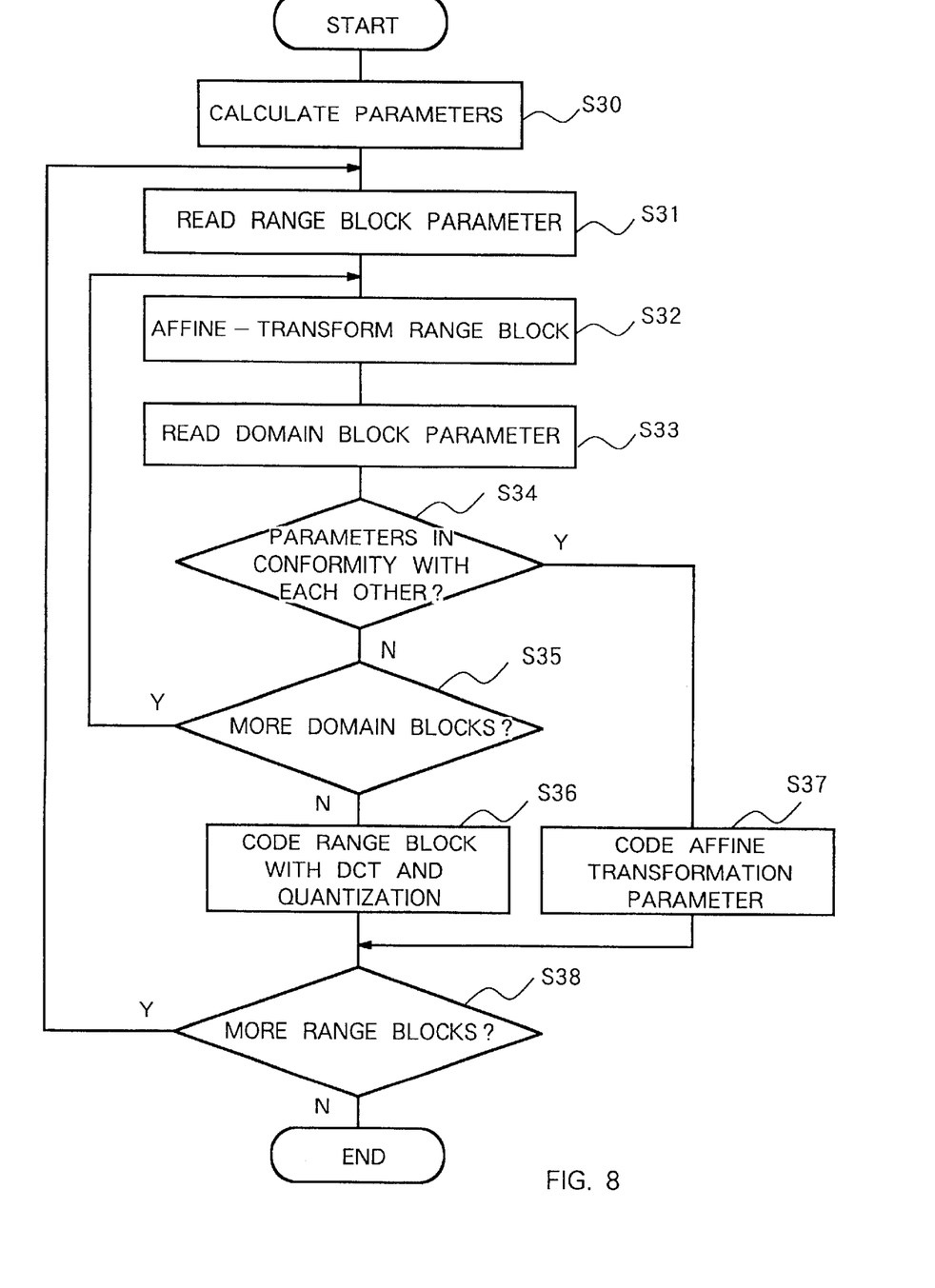
FIG. 8 is a flowchart of a processing sequence of a method of coding image data according to still another embodiment of the present invention.

FIG. 8 shows an operation sequence of a method of coding image data using an iterative transform coding process according to still another embodiment of the present invention. The method of coding image data shown in FIG. 8 can be carried out by modifying the function of the motion compensation predictor 14 shown in FIG. 3. The method of coding image data shown in FIG. 8 is applicable to not only the coding of moving image data, but also the coding of still image data. For coding moving image data, affine transformation is effected between frames. For coding still image data, affine transformation is effected within a frame.

As shown in FIG. 8, feature parameters which characterizes a range block to be coded and a domain block in an arbitrary search range are calculated, and stored in a read/write memory in a step S30. The feature parameters comprise binary information as shown in FIG. 7C.

In order to identify the position of the range block in the frame to be coded and the position of the domain block in the search range, identifiers of these blocks (or positional information thereof) are stored, along with the feature parameters, in the read/write memory.

After the above preparatory process, a search process is carried out. The feature parameter of the first range block is read from the memory in a step S31, and then the range block is affine-transformed in a step S32. The feature parameter of the first domain block in the search range is read from the memory in a step S33, after which the feature parameters of the range and domain blocks are compared with each other in a step S34.

The domain block whose feature parameter is in conformity with that of the range block is regarded as a block similar to the range block, and an affine transformation parameter between the domain and range blocks is coded in a step S37.

In this embodiment, there are available a certain number of affine transformation patterns. One of the affine transformation patterns whose similarity to the domain block is gained is identified by its parameter.

The search process is repeated with respect to all domain blocks in the search range until a domain block whose feature parameter is in conformity with that of the range block is found in a step S35. If no domain block whose feature parameter is in conformity with that of the range block is found, then the range block is coded by a discrete cosine transform using the DCT unit 2 and the quantizer 3 in a step S36.

The steps S31–S37 are repeated with respect to a next range block until all range blocks are processed in a step S38. As a result, when a domain block is identified which is similar to the range block in the search range, an affine transformation parameter between the domain and range blocks is coded, and when no domain block is identified which is similar to the range block in the search range, the range block is coded by a discrete cosine transform.

The feature parameters of the range and domain blocks may not necessarily be in complete conformity with each other, but may be regarded as being in conformity with each other if any difference therebetween falls within a certain allowable range.

If a domain block whose feature parameter is in conformity with that of the range block is detected in the step S34, then control may skip the step S35, and a next range block may be processed.

Figure 9:
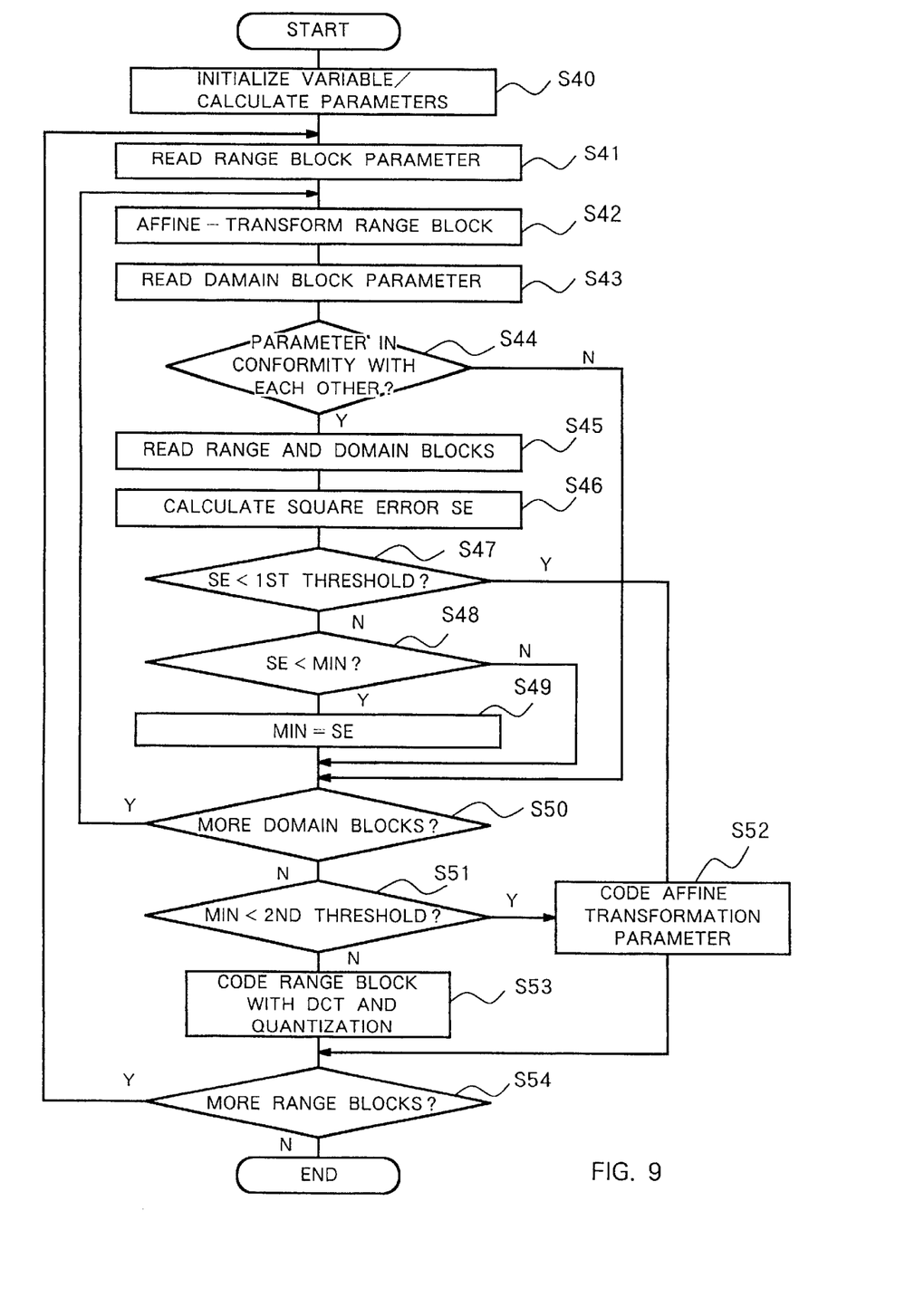
FIG. 9 is a flowchart of a processing sequence of a method of coding image data according to yet still another embodiment of the present invention.

FIG. 9 shows an operation sequence of a method of coding image data using an iterative transform coding process according to yet still another embodiment of the present invention. The method shown in FIG. 9 is designed to increase the accuracy of a search process with evaluations based on square errors, which are added to only those domain blocks whose feature parameters are in conformity with those of range blocks.

As shown in FIG. 9, a variable MIN which holds a minimum square error SE is initialized, and feature parameters which characterize range and domain blocks are calculated, and stored, along with information indicative of the positions of the blocks, in a read/write memory in a step S40.

The feature parameter of the first range block is read from the memory in a step S41, and then the range block is affine-transformed in a step S42. The feature parameter of the first domain block in the search range is read from the memory in a step S43, after which the feature parameters of the range and domain blocks are compared with each other in a step S44.

If the feature parameters are in conformity with each other, the domain and range blocks are read in a step S45, and a square error SE therebetween is calculated in a step S46.

The calculated square error SE is compared with a first threshold, which is preset to obtain similarity beyond a certain level, in a step S47. If the square error SE is smaller than the first threshold, then since the domain block is similar to the range block beyond the given level of similarity, an affine transformation parameter between the domain block and the range block is coded in a step S52.

If the square error SE is greater than the first threshold, then the square error SE is compared with the variable MIN in a step S48. If the square error SE is smaller than the variable MIN, then the square error SE is held as the variable MIN, and an affine transformation parameter with respect to the domain block is stored in the memory in a step S49.

If a range block whose square error SE is smaller than the first threshold is not found, then the steps S42–S49 is repeated until all domain blocks in the search range are processed in a step S50, and a square error SE smaller than the variable MIN held in the preceding processing cycle is held and an affine transformation parameter with respect to the domain block is stored in the step S49. As a consequence, an affine transformation parameter between a domain block which does not meet the first threshold condition, but whose square error is smallest in the search range, and the range block is identified.

The smallest error (MIN) is compared with a second threshold, which is preset to obtain similarity beyond a certain level, in a step S51. If the smallest error is smaller than the second threshold, then since the domain block is similar to the range block beyond the given level of similarity, an affine transformation parameter between the domain block and the range block is coded in the step S52. If the smallest error is greater than the second threshold, then the range block is coded by a discrete cosine transform using the DCT unit 2 and the quantizer 3 in a step S53.

The steps S41–S53 are repeated with respect to a next range block until all range blocks are processed in a step S54. As a result, when a domain block of high similarity is found with respect to all the range blocks to be coded, an affine transformation parameter thereof is coded, and when no domain block of high similarity is found, the range block is coded by a discrete cosine transform using the DCT unit 2 and the quantizer 3.

According to the present invention, as described above, inasmuch as a block similar to a block to be coded is sought from a search range by comparing feature parameters thereof, the similar block can easily and quickly be searched for, and a motion vector or an affine transformation parameter thereof can be coded. For example, while 64 subtractions, multiplications, and additions need to be effected on a block comprising a matrix of 8×8 pixels if the block is searched for using a square error, a similar block can be sought by one subtraction if feature parameters are compared.

Furthermore, an evaluation based on a square error is carried out on only a block whose feature parameter is in conformity with a block to be coded, a block matching process can be performed highly accurately with a less calculation burden than the conventional process.

Although certain preferred embodiments of the present invention have been shown and described in detail, it should be understood that various changes and modifications may be made therein without departing from the scope of the appended claims.

What is claimed is:

1. A method of coding a moving image according to a motion-compensated interframe coding process, said method comprising:

calculating feature parameters which characterize an input block of plural pixels in a frame to be coded and a block of plural pixels from another frame, wherein said feature parameter of the input block is based only on pixel values of the plural pixels in the input block and said feature parameter of the block from said another frame is based only on pixel values of the plural pixels in the block from said another frame;

comparing said feature parameters with each other to seek a block similar to the input block from said another frame without conducting a pixel-by-pixel comparison of all of the pixels in the input block and the block;

calculating an error between the pixel values of the plural pixels of the input block and the block similar to the input block which has been sought; and coding a motion vector between the input block and the block similar to the input block whose calculated error is smallest in a search range.

2. A method of coding a moving image according to a motion-compensated interframe coding process, said method comprising:

calculating feature parameters which characterize an input block of plural pixels in a frame to be coded and a block of plural pixels from another frame, wherein said feature parameter of the input block is based only on pixel values of the plural pixels from the input block and said feature parameter of the block from said another frame base only on pixels values of the plural pixels of the block from said another frame;

comparing said feature parameters with each other to seek a block similar to the input block from said another frame without conducting a pixel-by-pixel comparison of all of the pixels in the input block and the block;

calculating an error between the pixel values of the plural pixels of the input block and the block similar to the input block which has been sought;

comparing the calculated error with a predetermined threshold;

if the calculated error is smaller than said predetermined threshold, coding a motion vector between the input block and the block similar to the input block; and if the calculated error is greater than said predetermined threshold, continuously comparing said feature parameters to seek a block similar to the input block from said another frame, and coding a motion vector between the input block and the block similar to the input block whose calculated error is smallest in a search range.

3. A method of coding an image according to an iterative coding process by dividing a still image or a moving image into a plurality of blocks and seeking a domain block similar to a range block to be coded from a search range established in the still image or the moving image, and coding an affine transformation parameter between the range block and the domain block similar to the range block which has been sought, said method comprising:

calculating feature parameters which characterize a range block and domain blocks in the search range, wherein said feature parameter of the range block is based only on pixel values from the range block and each said feature parameter of each of the domain blocks is based only on pixel values from that domain block;

affine-transforming the range block and comparing said feature parameters with each other to seek a domain block similar to the range block without conducting a pixel-by-pixel comparison of all of the pixels in the range block and the domain blocks;

calculating an error between the pixel values of the range block and the domain block similar to the range block; and coding an affine transformation parameter between the range block and the domain block similar to the range block whose calculated error is smallest in the search range.

4. A method of coding an image according to an iterative coding process by dividing a still image or a moving image into a plurality of blocks and seeking a domain block similar to a range block to be coded from a search range established in the still image or the moving image, and coding an affine transformation parameter between the range block and the domain block similar to the range block which has been sought, said method comprising:

calculating feature parameters which characterize the range block and domain blocks in the search range, wherein said feature parameter of the range block is base only on pixel values from the range block and each said feature parameter of each of the domain blocks is based only on pixel values from that domain block;

affine-transforming the range block and comparing said feature parameters with each other to seek a domain block similar to the range block without conducting a pixel-by-pixel comparison of all of the pixels in the range block and the domain blocks;

calculating an error between the pixel values of the range block and the domain block similar to the range block which has been sought;

coding a motion vector between the range block and the domain block similar to the range block whose calculated error is smallest in the search range;

comparing the calculated error with a predetermined first threshold;

if the calculated error is smaller than said predetermined first threshold, coding an affine transformation parameter between the range block and the domain block similar to the range block;

if the calculated error is greater than said predetermined first threshold, continuously comparing the feature parameters to seek a domain block similar to the range block;

if the calculated error is smaller than a predetermined second threshold, coding an affine transformation parameter between the range block and the domain block similar to the range block; and if the calculated error is greater than said predetermined second threshold, coding the range block according to an orthogonal transformation.

* * * * *